United States Patent Office 3,130,154
Patented Apr. 21, 1964

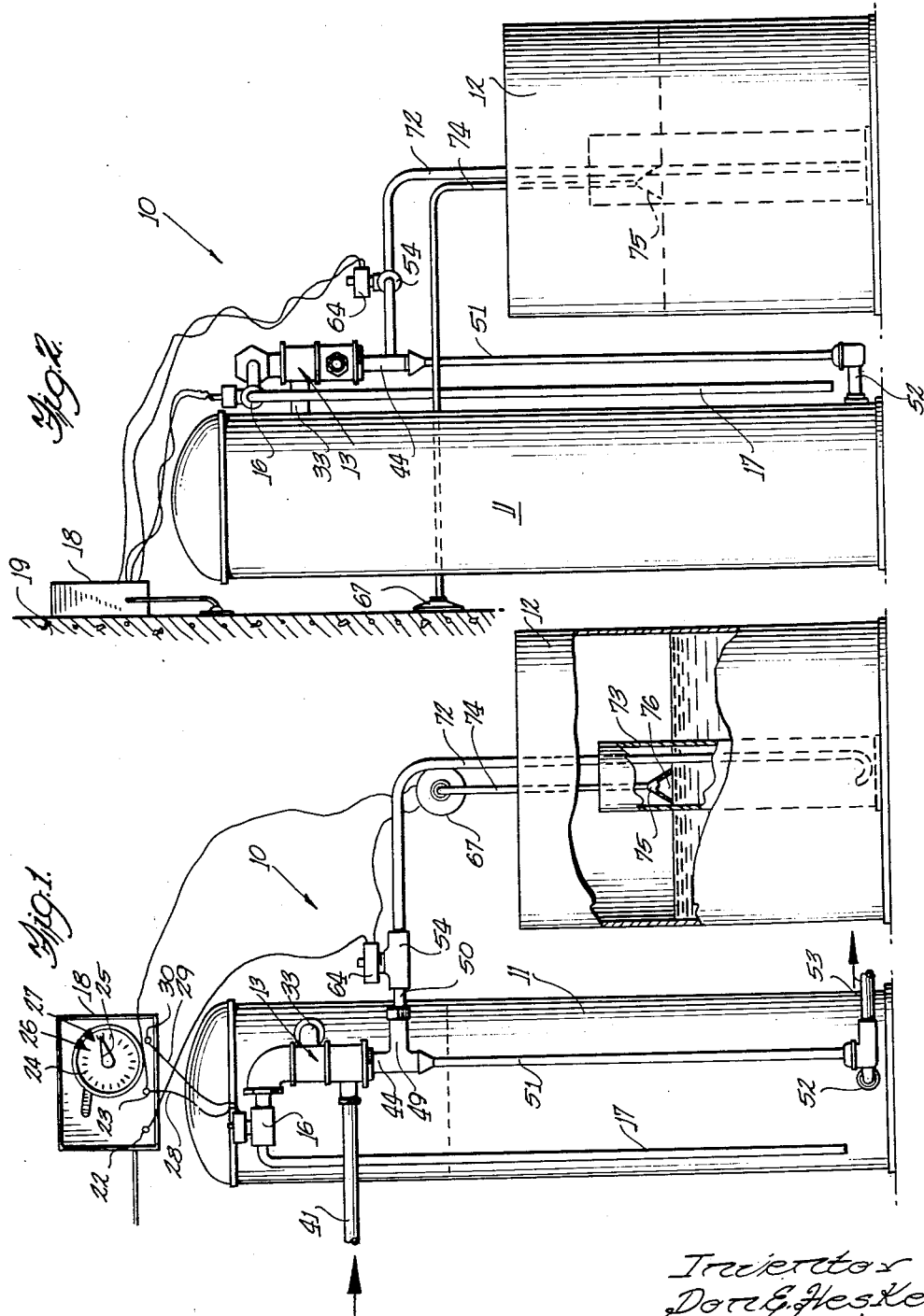

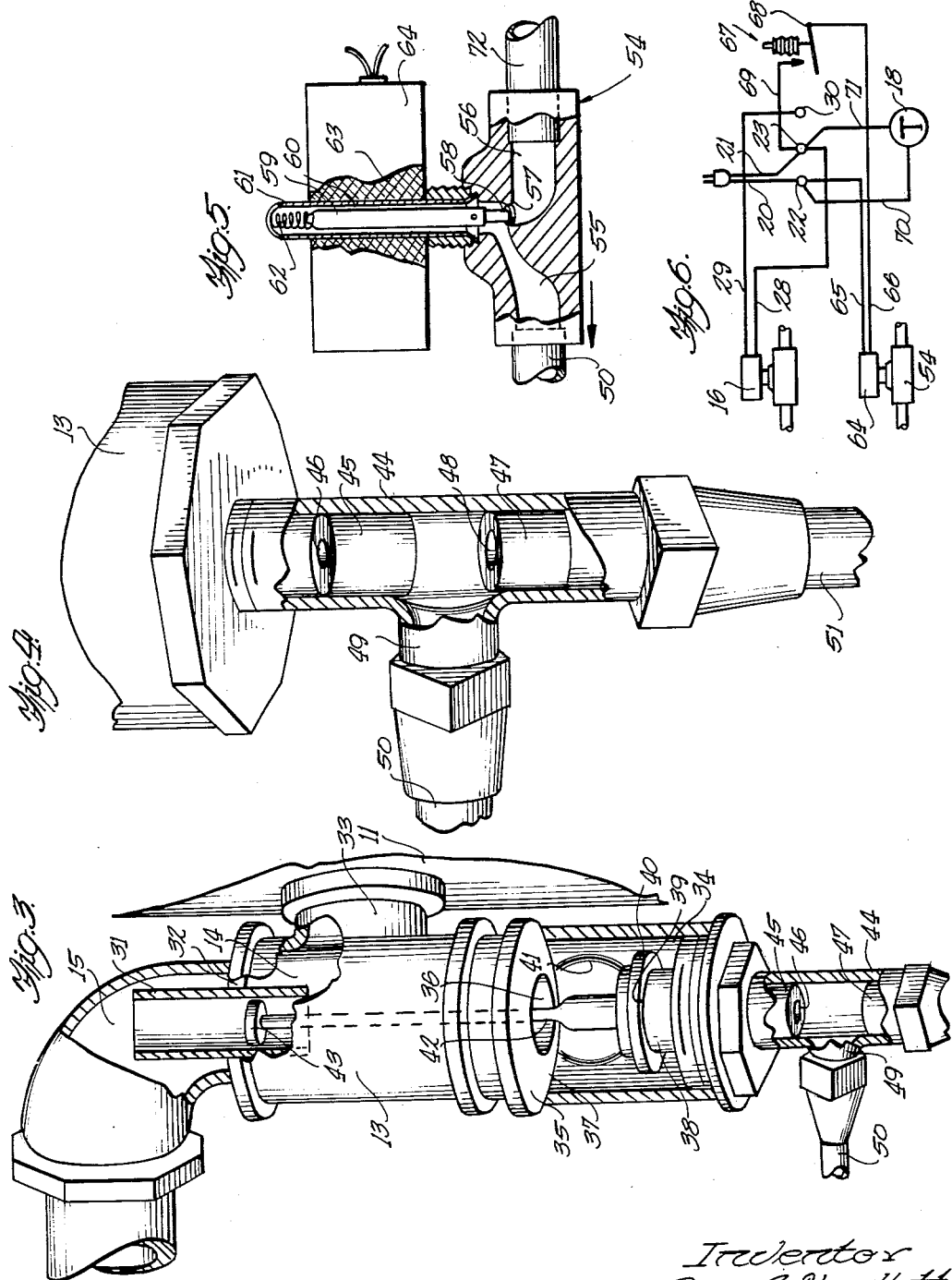

3,130,154
PRESSURE RESPONSIVE DEVICE FOR CONTROLLING LIQUID LEVEL IN TANKS
Don Edward Heskett, 1 S. 336 Euclid Ave.,
Villa Park, Ill.
Filed Jan. 2, 1962, Ser. No. 163,602
5 Claims. (Cl. 210—104)

This invention concerns a pressure responsive device for controlling the liquid level in a tank and the like. More specifically the invention concerns a liquid level control for water softening systems and the like.

A prime object of this invention is the provision of a pressure responsive valve mechanism adapted by means of a suction device to control the liquid level in a tank or chamber.

Another object is to provide a simplified control for transferring brine liquid from a brine tank to a softener tank in a water softening system.

A further object is to provide a control mechanism for emptying a brine tank or similar unit, the said control including an electrically controlled valve which is responsive to the liquid level in a tank to open whereby suction means associated with said valve will remove the liquid within the tank.

Another more specific object is to provide an improved mechanism for removing liquid from a tank when desired, said mechanism including a solenoid valve having resilient means normally urging said valve to a closed position and including a pressure responsive switch adapted to open said valve during a lowering of the liquid level within said tank, said initial lowering of said liquid level being effected by a suction means to initially draw liquid through said solenoid against the resilient closing means of said valve whereby said liquid is lowered sufficiently in said tank and said pressure responsive switch opens said solenoid valve for the further withdrawal of liquid from said tank.

These and other objects will become more readily apparent from a reading of the description in conjunction with the accompanying drawings, in which:

FIGURE 1 is a front elevational view of a water softening system comprising a softener tank and a brine tank partially in section including a pressure responsive liquid level control device;

FIGURE 2 is a side elevational view of the system shown in FIGURE 1;

FIGURE 3 is an enlarged perspective view of a hydraulic valve and portion of a water softener tank;

FIGURE 4 is an enlarged perspective view of a suction device for creating a suction or siphon effect;

FIGURE 5 is a cross-sectional view through a portion of a solenoid valve, and

FIGURE 6 is a wiring diagram showing the electrical circuit of a liquid level control device.

Referring now particularly to FIGURES 1 and 2 a water softening system is generally referred to by the reference character 10. The system 10 comprises a softener tank 11 and a brine tank 12. A hydraulic valve 13 includes an upper chamber 14 communicating with a fitting connection 15 connected to a first solenoid valve 16 normally closed and communicating with a drain line 17.

A timer clock is designated at 18 and may be mounted to a wall as indicated at 19. Electrical plug-in wires are designated at 20 and 21 in FIGURE 6 and lead to terminals 22 and 23. The clock 18 is conventional including a moving dial 24, a stationary pointer 25 and trip settings 26 and 27. The distance between the settings 26 and 27 represents a timed interval and said setting 26 is effective to break a suitable switch (not shown) at the end of the timed interval to open the circuit leading to the solenoid 16, the said circuit including wires 28 and 29, with wire 29 terminating at a terminal 30, and wire 28 terminating at terminal 23. The timer clock 18 and switch mechanism for controlling solenoid 16 is conventional and is not further described.

A cylindrical guide 31 is positioned partially in the fitting 15 and chamber 14 by means of one or more supports 32 within the chamber 14, so that water may travel within and around the guide 31. The chamber 14 is in communication with the interior of the tank 11 by means of a connection or conduit 33. The valve 13 is also provided with a lower chamber 34 separated by means of an annular valve member 35 having an opening 36 and a valve seat 37. The lower end of the chamber 34 is adapted to communicate with a valve connection 38, having a valve seat 39, shown in a closed position by means of a valve element 40. An inlet connection is designated at 41 and is in communication with a main source of water and communicates with the chamber 34. The valve element 40 is connected to a stem 42 which is provided at its upper end with a piston element 43, slidable in the cylindrical guide and cylinder 31.

As best shown in FIGURE 4, the valve 13 is connected to a conduit 44 which communicates with the chamber 34 during the open position of the valve element 40 relative to the valve seat 39. The conduit 44 at its upper end is provided with a plug 45 having an opening 46 of a certain diameter. A second lower plug 47 is provided with an opening 48 of larger diameter and between said plugs 47 and 48, there is provided a fitting 49 which has connected thereto a conduit 50. A conduit 51 is connected to the conduit 44. The conduit 51 at its lower end connects as indicated at 52 to the lower end of the tank 11. A pipe 53 from the conduit 51 conducts soft water to a conventional house system.

The fitting 49 communicates with a solenoid valve 54. The solenoid valve 54 is best shown in FIGURE 5 and includes a first passage 55 and a second passage 56. A valve seat opening 57 separates said pasages 55 and 56. The valve seat openings 57 may be opened and closed by means of a rubber valve element 58 suitably connected to a plunger 59 vertically slidable in a bearing sleeve 60 supported in a plunger housing 61 suitably connected to the valve 54. The plunger 59 is normally urged downwardly to seat and close the valve element 58 relative to the seat 57 by means of a spring 62. The plunger 60 may be moved upwardly by means of a conventional solenoid coil 63 provided in a housing 64. Wires 65 and 66 are connected to the coil 64. The wire 66, as best shown in FIGURE 6 is connected to one terminal of a pressure responsive switch 67 as indicated at 68. The wire 65 is connected to the terminal 22. A wire 69 connects the terminal 23 to the switch 67. The timer 18 is connected to terminals 22 and 23 respectively by wires 70 and 71.

The passage 56 communicates with a conduit 72 extending downwardly into the brine tank 12 and specifically into a cylindrical well 73 open at its upper and lower ends to communicate with the brine tank 12. The switch 67 is of a conventional type responsive to air pressure. Such switches are of conventional construction and may include diaphragms or bellows (not shown) which upon a certain air pressure will close contacts (not shown) to energize the solenoid valve 54. An air pressure line is designated at 74 and leads from the switch 67 to a bell 75 having an air pressure chamber 76.

The Operation

The timer 18 may be set to regenerate the softener tank at a specific time for a specific interval, as determined by the spacing of the settings 26 and 27. At this predetermined time the solenoid valve 16 is energized to open. Water under pressure from a water source now enters from the inlet conduit 41 into the chamber 34 and flows upwardly through the opening 36 into the chamber 14, around and through the guide 31 to the fitting 15. The pressure of water flow causes the piston element 43 to move the stem 42 and valve 40 upwardly whereupon the valve 40 opens relative to the valve seat 39 and closes the opening 36. The flow of water is now changed and flows downwardly through the openings 46 and 48. These openings are arranged to provide a Venturi or siphon effect creating suction on the conduit 50. The water flows downwardly through conduit 51 to the tank 11 and through conduit 33 to drain line 17.

The suction on conduit 50 moves the valve element 58 and plunger 59 upwardly against the spring 62 to open the valve seat 57 and thereby creating a suction on passage 56 and conduit 72. Brine from tank 12 is now moved through conduits 72, 50 and 49 to the conduit 51 and to the tank 11. In other words the suction opens the normally closed solenoid valve 54. As the liquid level in tank 12 is lowered, the pressure in chamber 76 is decreased so that the switch 67 is now activated to energize the solenoid to hold the plunger 59 in its open position. The brine tank now continues to supply the softener tank with brine until the end of the timed interval. At the end of this timed interval the solenoid valve 16 is closed by the spring 62 and the valve 40 is moved to the position shown in FIGURE 3. Since the brine has been removed from the brine tank 12, the pressure in chamber 76 has been reduced, the switch 67 has been activated to hold the valve 54 open, the water entering tank 11 from inlet conduit 41 now flows upwardly through conduit 51, through conduits 49, 50 and 72 to the brine tank 12. When the liquid level in tank 12 is such that the air within bell air chamber 76 is compressed, the switch 67 is deactivated and the plunger 59 is moved downwardly by spring 62 whereupon valve 58 closes seat 57 and solenoid valve 54 is closed. The system is now ready again for the next regeneration cycle as set by the timer.

The control of the system as effected by the Venturi, solenoid valve 54 and switch 67 provides an effective device for causing emptying of the tank 12. While this control is shown in connection with a water softening system, it is applicable to any tank where it is desired to transfer liquid from the tank to another location. Thus whenever a source of suction is provided the valve 54 and switch 67 are effective to initially cause the removal of a sufficient quantity of liquid to reduce the liquid level so that the valve is then held open until the tank is completely emptied.

Thus it is believed that the objects of the invention have been fully achieved and that changes and modifications may be made without departing from the spirit of the invention nor from the scope of the appended claims.

I claim:

1. In a water softening system having a softener tank and a brine tank,
   (a) a first valve having an inlet conduit,
   (b) said valve having a chamber connected to said inlet conduit,
   (c) a second conduit connected to said chamber and said softener tank,
   (d) and a third outlet conduit connected with said chamber and said softener tank,
   (e) said first valve including movable valve means in one position to provide for the flow of water from the inlet conduit to said second conduit and to said softener tank and in a second position providing for the flow of water from said inlet conduit through said third conduit and said brine tank,
   (f) a fourth brine conduit communicating with said third conduit to said softener tank,
   (g) an electrically actuated second valve connected to said fourth conduit to control the flow therethrough,
   (h) said second valve including a valve seat and a valve element normally urged into engagement with said seat for mounting said valve in a closed position, said valve element being pressure responsive during a suction on a portion of said fourth conduit disposed between said second valve and said third conduit to move from said seat to an open position, and held in said open position by suction,
   (i) means on said third conduit providing a suction on said portion of said fourth conduit during the closed position of said valve element and second position of said first valve whereupon said valve element is moved to an open position and fluid from said brine tank is initially withdrawn to said softener tank,
   (j) electrical actuating means for said second valve,
   (k) said actuating means including a pressure responsive switch having a pressure chamber with a gaseous fluid therein,
   (l) means connecting said switch to said second valve,
   (m) means providing direct communication of said pressure chamber with said brine tank wherein said switch is directly responsive to compression of said gaseous fluid in response to a rise in the liquid level within said brine chamber whereby said switch is de-energized and said valve is closed,
   (n) said switch being energized during decrease in pressure in said pressure chamber and lowering of the liquid level in said brine tank wherein said second valve is then electrically held in the open position permitting continued flow of brine through said fourth conduit to said softener tank in the second position of said first valve,
   (o) and said second valve in the open position and said first valve in the first position providing flow of water to said third and fourth conduit to said brine tank,
   (p) said pressure responsive switch being de-energized when said rise in the brine level again compresses air in said pressure chamber and said second valve is then returned to its closed position.

2. In a water softening system comprising a softener tank and a brine tank,
   (a) an inlet conduit,
   (b) a valve connected to said inlet conduit,
   (c) said valve including movable valve means being movable to a first position to connect said inlet conduit with said softener tank, and
   (d) a second conduit connected to said valve and said softener tank,
   (e) said valve means being movable to a second position to connect said second conduit with said inlet conduit;
   (f) a brine control means comprising,
   (g) a second electrically controlled valve including a movable valve element and a valve seat engaged thereby,
   (h) a third brine conduit connecting said second electrically controlled valve to said second conduit and said brine tank,
   (i) means normally urging said valve element to a closed position with respect to said valve seat, said valve element being pressure responsive during a suction on a portion of said brine conduit disposed between said second valve and said first valve to move from said valve seat to an open position, and to be initially held there by suction,
   (j) an electrical pressure responsive switch connected to said second valve,
   (k) a pressure chamber having a gaseous fluid in direct pressure responsive relation to the fluid level in said brine tank,
   (l) means communicating said pressure chamber with said pressure responsive switch whereby during a rise to a predetermined liquid level within said brine tank, said gaseous fluid is compressed to de-energize said switch and said second valve is moved to a closed position during the first position of said first valve,
   (m) and means on said second conduit during a second position of said first valve providing a suction on said portion of third brine conduit and said suction initially opening said second valve thereby holding said second valve open by suction and drawing brine from said brine tank in one direction, (n) whereupon said liquid level of said brine tank is lowered and said compression of said gaseous fluid is relieved in said chamber, said switch is then energized to electrically hold open said valve to permit the continuing flow of brine to said softener tank, (o) said first valve in the first position providing for the flow of water through said second conduit and third brine conduit in an opposite direction until the liquid level in said brine tank again reaches its predetermined liquid level.

3. A water softening device comprising:
(a) a first softener tank and a second brine tank,
(b) a fluid conduit connected to said first and second tanks,
(c) an electrical valve connected to said conduit to control the flow of fluid therethrough,
(d) said valve including a valve seat and a valve element normally urged to a closed position relative to said seat but being pressure responsive to vacuum on a portion of said fluid conduit disposed between said valve and first tank to move said valve element to an open position,
(e) means providing a suction on said portion of said fluid conduit whereby said valve element is initially moved to an open position and held open by said suction and brine fluid is drawn in one direction from said second tank to said first tank,
(f) an electrical pressure responsive switch connected to said valve,
(g) said switch having a pressure chamber containing a gaseous fluid,
(h) means connecting said pressure chamber with said second tank whereby said gaseous fluid is in direct pressure relation to said liquid and is compressed during a certain liquid level within said second tank and said switch is de-energized and said valve is closed, and whereby during a lowering of the liquid level in response to brine fluid flow from said second tank to said first tank, said compression of gas is relieved and said switch is energized to electrically hold the valve in the open position thereby permitting brine flow in said one direction.

4. A water softening device in accordance with claim 3 including,
means for supplying fluid in the open position of said valve element to said conduit to provide for the flow of liquid in an opposite direction to said second tank to raise the liquid level in said second tank and whereby said gaseous fluid is again compressed, said switch is de-energized and said valve element assumes its closed position stopping further flow of fluid.

5. A water softening device comprising:
(a) a first softener tank and a second brine tank,
(b) a fluid conduit connecting said tanks,
(c) an electrically actuated valve connected to said conduit including a valve seat and a valve element normally urged into engagement with said seat for closing said conduit,
(d) said valve element being pressure responsive to a suction on a portion of said fluid conduit disposed between the first tank and said valve to move said valve element from said seat to an open position, and to initially hold said valve open by suction,
(e) an electrical pressure responsive switch connected to said valve,
(f) said switch having a fluid pressure chamber including a gaseous fluid,
(g) means connecting said pressure chamber to said second tank whereby said gaseous fluid is in direct pressure relation to the liquid in said second tank wherein during a certain predetermined liquid level in said second tank, said gaseous fluid is compressed and said switch is de-energized and said valve element is closed,
(h) means providing a suction on said portion of said conduit whereby said valve element is initially opened and held open by suction and fluid flows from said second tank in one direction to said first tank,
(i) said gaseous fluid sensing a lowering in the liquid level and said pressure responsive switch is energized to then electrically hold said valve element in the open position to permit the continuing flow of fluid in said first direction,
(j) and means directing fluid to said conduit to flow liquid in an opposite direction to said second tank whereupon when said predetermined liquid level is again reached, said gaseous fluid is compressed to provide for de-energization of said switch and said valve element is again closed.

References Cited in the file of this patent
UNITED STATES PATENTS

| | | |
|---|---|---|
| 675,677 | Sanford | June 4, 1901 |
| 2,265,225 | Clark | Dec. 9, 1941 |
| 2,660,193 | Hanney | Nov. 24, 1953 |
| 2,751,347 | Miller | June 19, 1956 |
| 2,855,944 | Albin | Oct. 14, 1958 |
| 2,910,999 | Kimberly | Nov. 3, 1959 |